(12) United States Patent
Clement et al.

(10) Patent No.: US 12,276,117 B2
(45) Date of Patent: Apr. 15, 2025

(54) BOARD AND FLOOR PANEL BASED ON SUCH BOARD

(71) Applicant: FLOORING INDUSTRIES LIMITED, SARL, Bertrange (LU)

(72) Inventors: Benjamin Clement, Waregem (BE); Sam Ledegen, Ghent (BE)

(73) Assignee: UNILIN BV, Wielsbeke (BE)

( * ) Notice: Subject to any disclaimer, the term of this patent is extended or adjusted under 35 U.S.C. 154(b) by 398 days.

(21) Appl. No.: 17/625,253

(22) PCT Filed: Jun. 24, 2020

(86) PCT No.: PCT/IB2020/055967
§ 371 (c)(1),
(2) Date: Jan. 6, 2022

(87) PCT Pub. No.: WO2021/009584
PCT Pub. Date: Jan. 21, 2021

(65) Prior Publication Data
US 2022/0243483 A1 Aug. 4, 2022

(30) Foreign Application Priority Data

Jul. 16, 2019 (BE) .................................. 2019/5461
Dec. 10, 2019 (BE) .................................. 2019/5881

(51) Int. Cl.
*E04F 15/02* (2006.01)
*B32B 13/02* (2006.01)
(Continued)

(52) U.S. Cl.
CPC ........ *E04F 15/02038* (2013.01); *B32B 13/02* (2013.01); *B32B 13/10* (2013.01);
(Continued)

(58) Field of Classification Search
CPC ...... B32B 7/00–7/14; B32B 3/00–3/30; B32B 21/00–21/14; E04F 15/00–15/225
See application file for complete search history.

(56) References Cited

U.S. PATENT DOCUMENTS

| 610,778 A | 9/1898 | Walker |
| 5,103,614 A | 4/1992 | Kawaguchi et al. |
| (Continued) | | |

FOREIGN PATENT DOCUMENTS

| BE | 1026771 B1 | 6/2020 |
| CN | 101998896 A | 3/2011 |
| (Continued) | | |

OTHER PUBLICATIONS

"High-density fiberboard". Verband der Deutschen Holzwerkstoffindustrie e.V., (2013); pp. 1-9.*
(Continued)

*Primary Examiner* — Prashant J Khatri
(74) *Attorney, Agent, or Firm* — Workman Nydegger (57) ABSTRACT

Sheet material includes at least two layers of material, wherein a first layer of material forms more than half the thickness of the sheet material and is mainly built up from wood particles glued by means of a first binder and pressed. The first binder is thermosetting, wherein the second layer of material is present on the surface of the aforementioned sheet material and is mainly built up from particulate particles glued by a second binder and pressed. The second binder is thermoplastic and/or elastomeric.

15 Claims, 5 Drawing Sheets

(51) Int. Cl.
  *B32B 13/10* (2006.01)
  *B32B 19/02* (2006.01)
  *B32B 19/04* (2006.01)
  *B32B 21/02* (2006.01)
  *E04F 15/10* (2006.01)

(52) U.S. Cl.
  CPC ............ *B32B 19/02* (2013.01); *B32B 19/042* (2013.01); *B32B 21/02* (2013.01); *E04F 15/102* (2013.01); *E04F 15/107* (2013.01); *B32B 2250/02* (2013.01); *B32B 2260/025* (2013.01); *B32B 2260/046* (2013.01); *B32B 2471/00* (2013.01)

(56) References Cited

U.S. PATENT DOCUMENTS

| | | | |
|---|---|---|---|
| 8,940,124 | B2 | 1/2015 | Zierold |
| 9,573,343 | B2 | 2/2017 | Pervan |
| 10,794,068 | B2 | 10/2020 | Van Vlassenrode et al. |
| 10,913,176 | B2 | 2/2021 | Lindgren et al. |
| 2002/0050116 | A1 | 5/2002 | Tunis |
| 2003/0024199 | A1 | 2/2003 | Pervan et al. |
| 2003/0033777 | A1 | 2/2003 | Thiers et al. |
| 2004/0211144 | A1 | 10/2004 | Stanchfield |
| 2005/0035155 | A1 | 2/2005 | Gawlitta et al. |
| 2005/0054772 | A1 | 3/2005 | Papenfuhs et al. |
| 2009/0197058 | A1 | 8/2009 | Willham |
| 2010/0300030 | A1* | 12/2010 | Pervan .................. B32B 21/13 428/292.4 |
| 2012/0237747 | A1 | 9/2012 | Tai et al. |
| 2012/0318453 | A1 | 12/2012 | Zierold |
| 2014/0007791 | A1 | 1/2014 | Bhargava et al. |
| 2015/0017461 | A1 | 1/2015 | Lindgren et al. |
| 2015/0197942 | A1 | 7/2015 | Pervan et al. |
| 2015/0197943 | A1* | 7/2015 | Ziegler ................ B44C 5/0438 428/308.8 |
| 2015/0343739 | A1 | 12/2015 | Pervan |
| 2016/0355626 | A1 | 12/2016 | Larson et al. |
| 2017/0029653 | A1* | 2/2017 | Zhao .................... C09D 133/12 |
| 2017/0120558 | A1 | 5/2017 | Pervan |
| 2017/0203535 | A1 | 7/2017 | Oleske |
| 2017/0312936 | A1 | 11/2017 | Gier et al. |
| 2019/0210330 | A1 | 7/2019 | Ziegler et al. |
| 2019/0211571 | A1 | 7/2019 | Van Vlassenrode et al. |

FOREIGN PATENT DOCUMENTS

| | | | |
|---|---|---|---|
| CN | 102712175 | A | 10/2012 |
| CN | 104169100 | A | 11/2014 |
| CN | 105324251 | A | 2/2016 |
| CN | 109109430 | A | 1/2019 |
| CN | 109789663 | A | 5/2019 |
| EP | 2130991 | A2 | 12/2009 |
| EP | 1847385 | B1 | 9/2011 |
| EP | 2457954 | A1 | 5/2012 |
| GB | 1003597 | A | 9/1965 |
| GB | 1035256 | A | 7/1966 |
| RU | 2278880 | C2 | 6/2006 |
| RU | 2301234 | C2 | 6/2007 |
| RU | 100449 | U1 | 12/2010 |
| RU | 102027 | U1 | 2/2011 |
| RU | 2470787 | C2 | 12/2012 |
| RU | 2555016 | C2 | 7/2015 |
| RU | 2588243 | C2 | 6/2016 |
| RU | 2638984 | C2 | 12/2017 |
| RU | 2666866 | C2 | 9/2018 |
| RU | 2673654 | C1 | 11/2018 |
| SU | 1818233 | A1 | 10/1974 |
| WO | 1997047834 | A1 | 12/1997 |
| WO | 9936623 | A1 | 7/1999 |
| WO | 0247906 | A1 | 6/2002 |
| WO | 2003016655 | A1 | 2/2003 |
| WO | 03053642 | A1 | 7/2003 |
| WO | 2005044529 | A1 | 5/2005 |
| WO | 2006007413 | A1 | 1/2006 |
| WO | 2006066776 | A2 | 6/2006 |
| WO | 2009065769 | A2 | 5/2009 |
| WO | WO-2009124704 | A1 * | 10/2009 ............... B27N 3/06 |
| WO | 2010006409 | A1 | 1/2010 |
| WO | 2010038769 | A1 | 8/2010 |
| WO | 2011076916 | A1 | 6/2011 |
| WO | 2011077311 | A2 | 6/2011 |
| WO | 2011141849 | A2 | 11/2011 |
| WO | 2013139681 | A1 | 9/2013 |
| WO | 2015152802 | A1 | 10/2015 |
| WO | 2017072657 | A1 | 5/2017 |
| WO | 2018065859 | A1 | 4/2018 |

OTHER PUBLICATIONS

Deng, Shunyang, "Chemical Formula and Process Manual", Shanghai Scientific and Technological Press, Jan. 31, 2003, pp. 1024-1025.
Russian Search Report and Office Action from Corresponding Russian Patent Application No. RU2022103619, Nov. 17, 2023.
Belgian Search Report and Written Opinion from corresponding BE Application No. 201905461, Mar. 30, 2020.
Belgian Search Report and Written Opinion from corresponding BE Application No. 201905881, Jul. 14, 2020.
International Search Report and Written Opinion from corresponding PCT Application No. PCT/IB2020/055967, Oct. 12, 2020.

* cited by examiner

BOARD AND FLOOR PANEL BASED ON SUCH BOARD

BACKGROUND

The present invention relates to a sheet material and a floor panel based on said sheet material.

More particularly the invention relates to sheet materials that may be used for making imitation floor panels. Floor panels of this kind are known per se. For example, laminate floor panels with a substrate based on wood-fibre board, such as MDF or HDF (Medium or High Density Fibreboard), are known from WO 97/47834. Laminate floor panels of this kind comprise a top layer, based on one or more melamine resin-impregnated paper sheets, including a printed paper sheet that for example comprises a printed representation of a wooden floor panel. The print is protected by a transparent wearing layer, which is also made on the basis of a melamine-impregnated paper sheet, or a so-called overlay. It is quite well known that the laminate floor panels from the prior art can give rise to undesirable sounds, such as tapping noises, during use thereof. Such sounds may be irritating and give away that it is an imitation of for example real wooden parquet, although the appearance of such panels is barely distinguishable from the latter. The use of melamine resin in the top layer may further give rise to the development of residual tensile stresses in the top layer. Therefore high requirements must be imposed on the substrate. It is for example desirable that on the surface of the typical MDF or HDF board, a peak occurs in the density, which is able to withstand the high tensile stresses in the top layer. This peak in density may limit the risk of fracture in the top layer if there is any impact.

It is to be noted that in the standard production of MDF or HDF said peak density near the surface arises because the mat of glued wood fibres to be pressed is heated non-uniformly. The fibres close to the heating elements, namely on both surfaces of the fibre mat to be pressed, harden more quickly than the fibres that are located centrally in the fibre mat. This gives rise to non-uniform compaction. The present inventors have now concluded that this density peak in the hard MDF or HDF material gives rise to sounds in a frequency range that is perceived as irritating.

It is to be noted that laminate panels, as mentioned above, in practice are usually manufactured by the so-called DPL ("Direct Pressure Laminate") process. In this, a stack is formed with the substrate and the desired impregnated paper sheets for forming the top layer and the optional balance layer on the underside of the panel. This stack is then consolidated in a heated pressing operation using a short-cycle press and the resin present is cured. Optionally, a structure may be provided on the surface of the panel, as the press in question is equipped with a structured press element. The presence of the aforementioned density peak on the surface of the MDF or HDF substrate may lead to problems during pressing, especially when relatively deep structural elements are to be formed, for example structural elements with a depth of 0.2 mm or more, and/or with a depth greater than the thickness of the top layer, as is the case in WO 2006/066776.

Meanwhile, alternatives to laminate floor panels have come onto the market, which among other things produce a more acceptable sound. These are for example floor panels with a thermoplastic top layer and/or a flexible plastic core, for example as disclosed in WO 2011/077311 or WO 2011/141849.

Also, possibilities are known for example from WO 03/016655 for damping tapping noises with laminate floor panels somewhat by laminating an extra sound-damping layer at a position under the printed decorative skin. This solution leads to a quieter sound, but remains unnatural. In addition, the solution presented has reduced impact strength. The relatively brittle laminate layer may namely crack when, on impact, it follows the deformation of the underlying, softer, sound-damping layer. The method for making panels according to WO'655 is time-consuming, since the sound-damping layer must be glued to the substrate separately.

From WO 2010/088769, paper sheets are known for making laminate floor panels to be impregnated with polyurethane, and, from WO 2010/006409, a sheet material is known wherein wood fibres are bonded by means of a binder based on isocyanate and polyol. The cost associated with the manufacture of panels according to WO'769 or WO'409 is high and the properties of the sheet material from WO'409 may be inadequate for producing a floating laminate floor covering.

From EP 1 847 385 B1, with a view to better water resistance, a sheet material is presented with three layers of material, wherein a central layer of material is built up from wood chips or wood fibres glued by means of a first binder and pressed, and wherein a second or a third layer of material, which is built up from so-called WPC, i.e. wood-plastic composite, is present on both surfaces of the sheet material. The aforementioned WPC comprises fibrous particles glued by means of a second binder and pressed, wherein the second binder is an electrically conductive plastic, such as polyaniline or polypyrrole.

SUMMARY

The present invention aims in the first place to offer an alternative sheet material, wherein, according to various preferred embodiments, a solution is offered for one or more of the problems with the sheet material from the prior art, or with the floor panels that are made on the basis of said sheet material.

For this purpose, according to its first independent aspect, the invention relates to a sheet material with at least two layers of material, wherein a first layer of material forms more than half of the thickness of the sheet material and is mainly built up from wood particles glued by means of a first binder and pressed, wherein the first binder is thermosetting, with the characteristic feature that the second layer of material is present on the surface of the aforementioned sheet material and is mainly built up from particulate particles glued by means of a second binder and pressed, wherein the second binder is thermoplastic and/or elastomeric, or at least comprises substantially thermoplastic and/or elastomeric binder. The inventors have established that the use of particulate particles bonded with a thermoplastic and/or elastomeric binder on the surface of a sheet material that is further bonded by means of a thermoset, the tapping noise produced by said sheet material is very similar to that of real wood. In addition, the second layer of material allows smooth structuring on the surface in question and/or it may display some spring-back during deforming thereof in use. A sheet material of this kind may further have strength, as expressed with IB ("Internal Bond" measured according to EN 319:1993), that is comparable or the same as the sheet materials from the prior art. The presence of the aforementioned first layer of material is important for this.

Preferably the thickness of the aforementioned first layer of material is at least three times the thickness of the aforementioned second layer of material.

Preferably the aforementioned sheet material consists of the aforementioned two layers of material. Preferably the aforementioned first layer of material then forms at least 75% of the thickness of the sheet material, and the aforementioned second layer of material then forms 25% or less of the thickness of the sheet material. According to this embodiment, the first layer of material offers sufficient mechanical strength, whereas the second layer of material may be provided to produce the desired sound, and/or in order to be structured easily. The inventors have established that the resultant asymmetric structure of the sheet material need not necessarily give rise to dimensional instability, such as cupping. It is namely still possible, despite the asymmetric structure of the material, to obtain a symmetrical density profile through the thickness of the sheet material.

Preferably the particulate particles of the aforementioned second layer of material are, or comprise, wood chips. Wood chips have internal vascular channels and thus allow a more flexible second layer of material to be obtained than would be the case if wood fibres were to be employed in the second layer of material. It is of course also possible to work with other particulate particles or with a mixture of particulate particles from different materials. Thus, for example it is possible to make use of ground, preferably hard, plastic and/or rubber as particulate particles, or to make use of ground textile or carpet waste. The particulate particles, especially wood chips, of the second layer of material may be impregnated with a synthetic material, such as glycerol. This serves to improve the performance of the second binder. The particulate particles of the aforementioned second layer of material may also be, or comprise, wood fibres.

Preferably the wood particles of the aforementioned first layer of material are wood fibres.

The aforementioned first binder is preferably selected from the group of melamine-formaldehyde, urea-formaldehyde, melamine-urea-formaldehyde, phenol-formaldehyde, phenol-urea-formaldehyde, MDI (methylene diphenyl diisocyanate), pMDI (polymeric methylene diphenyl diisocyanate), thermosetting acrylate resin and a binder obtained by reaction with dextrose, for example such as a binder as described in EP 2 457 954.

Preferably the first layer of material has the material structure of a wood fibre board, such as MDF or HDF, namely wherein the wood particles are wood fibres and more preferably with a first binder selected from the group of melamine-formaldehyde (MF), urea-formaldehyde (UF), melamine-urea-formaldehyde (MUF), MDI ("methylene diphenyl diisocyanate") and pMDI ("polymeric methylene diphenyl diisocyanate").

Another independent aspect of the invention relates to a sheet material. The sheet material comprises at least two layers of material, wherein a first layer of material forms more than half of the thickness of the sheet material and is substantially composed of a mineral sheet, characterized in that the second layer of material is present on the surface of the aforementioned sheet material and is mainly built up from particulate particles glued by means of a second binder and pressed, wherein the second binder is thermoplastic and/or elastomeric. The sheet material of this independent concept has the same advantages as the sheet material of the first aspect of the invention. Unless there is an incompatibility, the described embodiments of the first aspect of the invention may also be used in this other independent aspect of the invention.

In preferred embodiments of the other independent aspect of the invention, the mineral sheet is or comprises a magnesium oxide sheet, a fibre cement sheet or a plasterboard.

In preferred embodiments of the other independent aspect of the invention, the mineral sheet comprises filler, for example wood particles, wood dust or wood fibres.

Preferably the particulate particles of the aforementioned second layer of material have a particle size of 500 micrometres or more, as expressed with the d50 value measured by laser diffraction granulometry, preferably in accordance with ISO13320 (2009). Particulate particles of this kind provide a more compactable and resilient second layer of material that is well able to absorb and dissipate vibration. Preferably the particle size, as expressed with the aforementioned d50 value, is less than 3 mm. The most preferred range for the d50 value of the particulate particles is between 1 and 2.4 mm.

The aforementioned second binder is preferably thermoplastic and is selected from the group of polyvinyl butyral (PVB), polyvinyl butyrate, polyvinyl chloride (PVC), polyvinyl dichloride (PVdC), polypropylene (PP), polyethylene (PE), polyethylene terephthalate (PET), thermoplastic polyurethane (TPU), thermoplastic aliphatic polyester, such as polylactic acid (PLA), thermoplastic olefin (TPO). The second binder is preferably halogen-free, for example preferably selected from the group of polyvinyl butyral (PVB), polyvinyl butyrate, polypropylene (PP), polyethylene (PE), polyethylene terephthalate (PET) and thermoplastic polyurethane (TPU). According to a variant, the aforementioned second binder is elastomeric and is selected from the group of synthetic rubber (neoprene), optionally crosslinked polyvinyl butyral (PVB), silicone and natural rubber (polyisoprene).

According to a particular possibility, the aforementioned second binder is obtained at least partially as a recycled material. For example, the aforementioned polyvinyl butyral (PVB) may be obtained from the recycling of glass, more particularly recycling of safety glass.

Preferably, the aforementioned second binder consists of or comprises polyvinyl butyral, more preferably cross-linked polyvinyl butyral. Preferably, one or more from the group of epoxy resin, dialdehydes, phenol resin and melamine resin are used as cross-linkers.

Polyvinyl butyral (PVB) which can be cross-linked is produced when, during the production of the polyvinyl butyral, not all hydroxyl groups of the polyvinyl alcohol react with butyraldehyde. As a result thereof, the polyvinyl butyral (PVB) still contains hydroxyl groups which may lead to cross-linking by reacting with crosslinkers, resulting in the formation of an elastomer, polyvinyl butyral (PVB).

Preferably, the aforementioned second binder consists of or comprises polyvinyl butyral, more preferably the polyvinyl butyral comprises plasticizers.

Preferably, the particulate particles are coated with glue with a thermosetting binder before being glued and pressed. More preferably, this gluing is performed using melamine formaldehyde, urea formaldehyde, melamine-urea-formaldehyde, phenol formaldehyde, phenol-urea-formaldehyde, MDI (methylene diphenyl diisocyanate), pMDI ("polymeric methylene diphenyl diisocyanate"), thermosetting acrylate resin, or a binder obtained by a reaction with dextrose. More preferably, methylene diphenyl diisocyanate (MDI) which comprises a polyol or a polycaprolactam or another flexible chain extender; or polymeric methylene diisocyanate (pMDI) which comprises a polyol or a polycaprolactam or another flexible chain extender.

Coating the particulate particles with glue before gluing and pressing them has a number of advantages. The water resistance of the sheet material is improved. Coating with glue also prevents delamination during pressing. The thermoset ensures the internal bonding during the pressing stage when the second binder becomes thermoplastic.

According to another particular preferred possibility, whether or not combined with the aforementioned particular possibility, the second layer of material comprises, alongside the second binder and the particulate particles, also a glue fraction, preferably a thermosetting glue and/or a glue selected from the group of urea-formaldehyde, melamine-urea-formaldehyde, (p)MDI, polyvinyl alcohol (PVA), polyvinyl acetate (PVAc), polyurethane, acrylate dispersion or latex dispersion. If necessary, these thermosetting resins may be emulsified in order to improve the processing. Addition of said glue can increase the internal bonding and the water resistance, as well as improving the ability of the second layer of material to maintain a pressed structure, for example such as may be the case when the sheet material is used as a substrate in DPL pressing. As mentioned above, the particulate particles, in particular the wood chips, of the second layer of material may be impregnated with for example glycerol. Said impregnation increases the efficiency of the glue fraction, so that an acceptable sound can be obtained in combination with acceptable internal bonding. Preferably the aforementioned second layer of material comprises 0.5 to 5 wt % of such glue, more preferably 2 to 4 wt %.

Preferably the first and the second layers of material are consolidated in one and the same pressing operation and are bonded together, wherein more preferably the polycondensation moisture formed during the reaction of the first binder is absorbed into the wood fibres. Preferably a density profile then develops over the thickness of the sheet material, which in each case has a peak density near the surfaces. Preferably, one peak is formed in the material of the first layer of material, while a second peak is formed in the material of the second layer of material. Preferably the peaks are of equal height or of almost equal height, for example the peak near one surface is at most 10 percent higher than the peak near the other surface. The density between the aforementioned peaks preferably remains below the level of the aforementioned peaks. Thus, in the new sheet material a symmetrical or almost symmetrical density profile is obtained, similar to the density profile of HDF sheet material from the prior art. According to the present invention, at least one of the peaks is located in the aforementioned second layer of material. Because this density peak is located in softer material, a tapping sound is obtained that is very comparable to that of real wood. The present inventors realized that they could make use of the non-uniform curing and compaction that arises in standard HDF production, with the difference that one of the density peaks is formed in the aforementioned second layer of material, and accordingly produces a less irritating sound. Preserving the density peak in the first layer of material on the other surface of the sheet material is beneficial for the strength of an optional coupling means that may be located there. For example, it is possible that a lower groove lip in a tooth-and-groove coupling system is made at least partially in this high-density material, so that a higher bonding strength can be obtained.

According to an embodiment of the first independent aspect or of the other independent aspect, the sheet material comprises a third layer of material, wherein the first layer of material is situated between the second layer of material and the third layer of material, wherein the third layer of material has the features of the second layer of material as described in any embodiment of the first independent aspect of the invention. Such embodiments offer more improved sound insulation, for example when using the sheet material as floor covering, more particularly when using the sheet material as floating floor covering.

According to an embodiment of the first independent aspect or of the other independent aspect, the surface of the first layer of material has a first colour, and the surface of the second layer of material has a second colour, wherein the surface of the first layer of material is visible on the surface of the sheet material next to the surface of the second layer of material according to a regular or irregular pattern. According to these embodiments, it is for example possible to mill through the surface of the second sheet material, thus rendering a part of the surface of the first sheet material visible. The milling operation may, for example, form letters which make the surface of the first sheet material visible against a background of the second sheet material, or vice versa.

According to a particular independent aspect, the present invention relates to a sheet material with a density profile that has a peak near both surfaces, and wherein the density between the aforementioned peaks remains below the level of the aforementioned peaks, with the characteristic feature that a first one of the aforementioned peaks is located in a layer of material that comprises thermosetting binder, while a second of the aforementioned peaks is located in a layer of material that comprises thermoplastic or elastomeric binder. It is obvious that a sheet material according to said particular aspect may further have the features of the first independent aspect of the invention and/or preferred embodiments thereof. Preferably the density between the aforementioned peaks remains above 80% of the average density of the sheet material. The average density of the sheet material is preferably at least 550 kg/m$^3$, or better still at least 700 kg/m$^3$ or at least 800 kg/m$^3$.

According to the most preferred embodiment of the present invention, according to its first aspect, the sheet material consists of a first and a second layer of material, and it is essentially free from further layers of material. The binder of the first layer of material is melamine-urea-formaldehyde and the wood particles in the first layer of material are wood fibres. The first binder makes up 3 to 20 wt % of the first layer of material, preferably about 14 wt %. The first layer of material has a thickness of at least 70% of the thickness of the sheet material. The binder of the second layer of material is polyvinyl butyral (PVB) and the wood particles in the second layer of material are wood chips. The polyvinyl butyral (PVB) content in the second layer of material is between 10 and 60 wt %, preferably between 25 and 50 wt %, or better still between 35 and 50 wt %. The content of wood chips in the second layer of material is between 40 and 75 wt %, or better still between 50-65 wt %. Preferably the second layer of material further comprises a glue fraction. This glue fraction may be provided by gluing the wood chips. The glue ratio of the wood chips is preferably 2.5 to 7.5 wt %, and better still 4 to 6 wt %, and even better 2 to 4 wt %. The glue may be for example MDI, UF, MUF, or polyurethane. The second layer of material has a thickness of 30% or less of the thickness of the sheet material.

On the basis of the composition of the aforementioned most preferred embodiment, the inventors obtained a board with an internal bond strength from 0.5 to 1.5 N/mm$^2$, and even from 0.7 to 1.5 N/mm$^2$, measured according to EN 319:1993.

The material of the different layers of material of the board of the first independent aspect is preferably provided in each case by means of several spreading operations. A method for making the sheet material of the first independent aspect forms in itself a particular independent aspect of the invention, and preferably comprises the following steps:

optionally the step of providing glue on the particulate particles of the second layer of material. For example, wood chips may be mixed and glued with 2 to 7 wt % (and preferably 2 to 4 wt %) of a thermosetting glue, such as phenol-formaldehyde, urea-formaldehyde, melamine-urea-formaldehyde, MDI (methylene diphenyl diisocyanate), polyurethane dispersion or acrylate dispersion;

the step of providing particles based on the second binder. For example, particles of polyvinyl butyral (PVB), for example recycled polyvinyl butyral (PVB), may be provided;

optionally the step of mixing the particulate particles in the particles of the second binder;

the step of depositing the wood particles of the first layer of material, and the first binder, on a conveying device or in a mould. Preferably melamine-urea-formaldehyde (MUF) or methylene diphenyl diisocyanate (MDI) glued wood fibres are deposited;

optionally the step of compacting the deposited wood particles and the first binder;

optionally the step of wetting the already deposited wood particles and the first binder with for example water and/or glue; the adhesion and internal bonding may be improved in this way;

the step of depositing particulate particles and binder particles of the second layer of material on the deposited wood particles and the first binder. This step is preferably carried out on the basis of one or more spreading operations.

optionally the step of wetting all of the deposited materials with for example water and/or glue; the adhesion and internal bonding may be improved in this way;

the step of compacting and heating all of the deposited materials. Preferably the compaction and heating takes place in a double-band press, preferably in only one double-band press. Preferably the material of the first and the second layer of material is heated and compacted at the same time. During the same processing, preferably adhesion is also obtained between the two layers of material.

Preferably a cohesive sheet material is obtained that consists of two layers of material, namely the aforementioned first layer of material and the aforementioned second layer of material. The inventors have established that the presence of the second binder of thermoplastic and/or elastomeric nature can create a flat surface during the compacting and heating step. The risk of possible pressing-through or transfer of irregularities in a deposited layer to the surface of the second layer of material is limited. In comparison with MDF or HDF sheet material from the prior art, no or fewer sanding operations are required to obtain an easily laminatable surface. The thermoplastic or elastomeric second binder flows between the larger particulate particles, in particular the wood chips, and thus flattens the surface obtained.

It is clear from the foregoing that the sheet material of the invention can be obtained in one pressing operation, and that separate pressing operations or additional gluing operations are superfluous.

For the step of depositing particulate particles and binder particles of the second layer of material on the deposited wood particles and the binder of the first layer of material, various concrete possibilities exist, for which some notable possibilities are enumerated hereunder, without being an exhaustive list.

According to a first concrete possibility, a mixture of glue-treated wood chips and polyvinyl butyral (PVB) particles is spread by means of one and the same spreading operation.

According to a second concrete possibility, two separate spreading operations are employed. Glue-treated wood chips are spread in a first spreading operation, and polyvinyl butyral (PVB) particles are spread in a second spreading operation.

According to a third concrete possibility, the procedure is the same as in the second possibility, but a third separate spreading operation is added, in which glue-treated wood chips are spread.

According to a fourth concrete possibility, the procedure is the same as in the third possibility, but non-glued wood chips are spread in the third separate spreading operation.

According to a fifth concrete possibility, a spreading operation is carried out, wherein granules or a compound of wood chips and polyvinyl butyral (PVB) are spread.

According to a sixth concrete possibility, the procedure is the same as in the fifth possibility, but a further second separate spreading operation is provided, in which non-glued wood chips are spread.

According to a seventh concrete possibility, the procedure is the same as in the sixth possibility, but glue-treated wood chips are spread in the second separate spreading operation.

According to an eighth concrete possibility, two or more spreading operations are employed, wherein granules or a compound of wood chips and polyvinyl butyral (PVB) are spread, wherein the compounds in the different spreading operations may optionally have a different composition. The difference in composition may be expressed by different proportions in percentages by weight between the binder and the particle, and/or by different particle shapes and/or sizes of the binder and/or particle in the different compounds. According to a first important example of this, the composition of the compound from the first spreading operations may preferably be adjusted to obtain sufficient adhesion on the material of the first layer of material, whereas the compound from for example a second or subsequent spreading operations may be tailored to obtain a smooth surface with a limited risk of pressing-through of spreading irregularities from underlying layers to the surface of the sheet material. According to a second important example of this, the size of the wood chips or particulate particles of the second layer of material is varied, preferably in such a way that of two successive spreading operations, a first spreading operation deposits coarser wood chips or particulate particles than a second spreading operation. According to a third important example of this, the melting point of the second binder is varied, preferably in such a way that in two successive spreading operations, a first spreading operation has a lower-melting binder than a second spreading operation.

It is to be noted that the combination of different sizes and shapes of compounds/granules may lead to improved sintering, so that the sheet material obtained forms a more cohesive whole, for example with an internal bond of 0.7 N/mm$^2$ or more. It is further to be noted that each of the spread sublayers of the second layer of material may be produced individually with their own specific binder-to-particles ratio, proportion of glue and particle size distribution.

Although the concrete possibilities described above have wood chips as particulate particles and polyvinyl butyral (PVB) as binder, these may of course, mutatis mutandis, be carried out with other particulate particles and second binders.

Although particulate polyvinyl butyral (PVB) or granules/compounds are discussed above, polyvinyl butyral (PVB), or another second binder, can be prepared in various other ways. For example, PVB can be micronized, cut, cut cryogenically, be subjected to micro-extrusion, micro-pelleting or granulation, as already mentioned earlier. Regardless of the manner in which the particulate polyvinyl butyral (PVB) is obtained, preferably it has an average particle size, as expressed with the d50 value measured by laser diffraction granulometry (ISO13320(2009)), from 0.1 to 2 mm. The lowest range is obtained for example by micronizing, whereas the larger particles may be obtained by extrusion.

In all the aforementioned concrete possibilities, one or more of the aforesaid spreading operations may be carried out, as mentioned above, by spraying water and/or glue on the already deposited material. As glue, it is possible for example to work with MUF, UF, MF, MDI, PVA or PVAc. Water may promote heat transfer in the compacting and heating step, so that a more cohesive whole, i.e. a higher internal bond according to EN 319:1993, may be obtained. A similar result may be achieved by spraying with glue.

With the same aim as in the first independent aspect, according to a third independent aspect the present invention relates further to a floor panel with a substrate obtained from a sheet material according to the first independent aspect and/or according to the other independent concept and/or according to the aforementioned particular independent aspect and/or obtained by a method according to the second independent aspect and/or with the characteristic features of one or more preferred embodiments of each of these aspects. It is clear that said floor panel can form a better imitation of a real wooden floor panel because the sound during use more closely resembles the sound of a wooden floor panel, and/or because said floor panel, regardless of the imitation that it forms, produces a less irritating sound.

Preferably the floor panel comprises a decorative top layer that is applied on the surface of the aforementioned sheet material that is formed by the aforementioned second layer of material. It is clear that in such a case the effect on the sound produced is the most marked. In addition, this offers the best way of applying the possibility of structuring the second layer of material. Also the spring-back effect or creep-back effect after impact on this layer may best be utilized in a configuration according to the present preferred embodiment.

Preferably the aforementioned decorative top layer comprises a printed paper sheet and a transparent or translucent layer applied thereon. The aforementioned transparent or translucent layer preferably comprises synthetic material which is at least subjected to thermal curing. Said synthetic material can easily be textured and/or structured, for example on the basis of a heated structured mould or press element. Thermally cured acrylate resin or an unsaturated polyester is preferably used for the aforementioned synthetic material. Said synthetic material is tough, and the risk of fracture in the respective layer of synthetic material on impact is limited. This risk is in itself higher than with the laminate floor panels from the prior art owing to the presence of the aforementioned second layer of material. The use of the aforementioned synthetic materials in the top layer allows the second layer of material to be softer and/or more springy than would be the case with for example a top layer based on melamine. In addition, the second layer of material may exert a restoring effect on any dents due to impact on the top layer. The inventors have now established that any dents on the surface of the top layer may disappear completely or partially by adding the aforementioned second layer of material of the sheet material. Such is mainly the case when the second layer of material comprises polyvinyl butyral (PVB) as second binder and wood chips as particulate particles. The use of a top layer based on thermally cured acrylate resin or an unsaturated polyester has much less residual tensile stresses than is the case for example with a top layer based on melamine resin, as is the case with the laminate floor panels from the prior art.

Preferably the aforementioned decorative top layer has a relief with structural features that have a depth greater than the thickness of the decorative top layer. Preferably the aforementioned structural features form lower edge regions at least on one or more edges of the floor panel, such as edge regions in the form of a chamfer. In the case of lower edge regions, whether or not in the form of a chamfer, the decorative effect preferably extends up to the respective upper edge. Preferably the respective upper edge and/or the underside of the decorative top layer, at the upper edge, is located on a horizontal level that extends below the level of the aforementioned second layer of material. In this way, the second layer of material is extensively shielded from influences such as possible moisture penetration via the seam between the upper edges of adjacent floor panels. The structural features in question can be obtained at least on the basis of a heated pressing operation with a structured press element. During said pressing operation, the synthetic material of the top layer can be cured, and optionally the binder of the second layer of material is melted or at least made pliable so that the second layer of material follows the impressed structure of the top layer. It is also possible that, in combination with a heated pressing operation, the sheet material has a structure before it is transferred to the pressing operation, for example because the second layer of material is processed locally for example by a machining operation, and/or because the second layer of material is not applied uniformly on the first layer of material. For example, a technique may be applied such as is known per se for MDF or HDF substrates from WO 2017/072657.

It is clear that the aforementioned decorative top layer may also be of some other type than a top layer that comprises a printed paper sheet and a transparent or translucent layer applied thereon. For example, the decorative top layer may comprise a wood veneer, a, preferably printed, film out of synthetic material, such as a printed PVC film with a PVC-based wearing layer applied thereon, a print formed directly on the substrate with a transparent varnish coat applied thereon, such as an acrylic-based varnish coat, or the like.

In general the aforementioned decorative top layer may comprise a UV-cured or electron beam (EB) cured transparent synthetic material, wherein said top layer may then comprise a printed paper sheet or a print formed directly on the substrate.

It is clear that, where there is mention in the foregoing of a print formed directly on the substrate, it is not excluded that before it is printed, the substrate is prepared on the basis of one or more priming coats or primers. Here, "print formed directly on the substrate" means a print that is formed by depositing ink or other colouring matter in a pattern on the substrate and optionally the priming coats and layers of primer, preferably by means of a printing process such as rotogravure, screen printing or inkjet printing.

It is to be noted that on the basis of the present invention, according to one or more of the aforementioned aspects thereof, in an MDF or HDF production line from the prior art, an additional acoustically acting layer, namely the aforementioned second layer of material, may be formed, wherein this acoustically acting layer alters the frequencies of the surface sound in such a way that the surface imitates the sound of real wood. At the same time, the compressibility of the sheet material is increased, so that more complex and deeper surface structures may be applied by means of a standard short-cycle press (single daylight press) and structured press elements. In this way, the appearance of a real wooden floor can be imitated even better. The inventors have further established that the use of the second layer of material according to the invention improves the performance (for example scratch resistance and wear resistance) of an acrylic-based top layer in comparison with a top layer of this kind applied on an MDF or HDF substrate. As mentioned above, it is preferably a thermally cured acrylic-based top layer, for example such as a top layer of the type that is described in the applicant's BE 2018/5787, which was not published on filing. Preferably, the top layer, for example the wearing layer that is applied over a printed decorative effect, comprises a thermally cured acrylate resin or unsaturated polyester resin. The aforementioned acrylate resin is preferably cured on the basis of a thermally initiated radical crosslinking reaction. The aforementioned curing preferably comprises at least one crosslinking of the double carbon bond present in the acrylate resin. The aforementioned wearing layer is preferably obtained on the basis of a mixture of acrylate resin and a thermal initiator or optionally a mixture of a thermal initiator and a photo-initiator. The aforementioned thermal initiator is preferably an organic peroxide, preferably benzoyl peroxide, lauryl peroxide, ketone peroxide or diacyl peroxide or an initiator selected from the list of peroxyester, peroxyketal, hydroperoxide, peroxydicarbonate, peroxymonocarbonate and AZO polymerization initiator. The aforementioned mixture preferably comprises 0.1-5 parts of thermal initiator per 100 parts of acrylate resin, and preferably 0.5-2 parts of thermal initiator per 100 parts of acrylate resin. The wearing layer may be cured uniformly or almost uniformly through its full thickness. As mentioned above, the thermal curing preferably comprises chemical crosslinking, preferably of the double carbon bonds present in the acrylate resin. The aforementioned decorative effect may comprise a carrier film provided with synthetic material, such as a paper sheet, wherein said synthetic material comprises double carbon bonds, for example selected from the list of polyurethane, urethane-acrylic copolymer, acrylate, latex, polyether and polyester, optionally in combination with a crosslinking agent. Alternatively or additionally, synthetic materials without double bonds, e.g. polyurethane dispersions, may also be used.

In the case of a top layer that comprises acrylate resin, aliphatic acrylate resin is preferably used and/or the acrylate resin in question can at least be obtained on the basis of a multifunctional acrylate monomer and/or oligomer, such as a hexafunctional acrylate oligomer and/or at least be obtained on the basis of a monofunctional or bifunctional acrylate monomer and/or oligomer and/or at least be obtained with a chemically modified acrylate, such as with a fluoroacrylate.

A method for making covered panels or floor panels with the features of the invention is preferably further characterized in that the panels comprise at least one substrate based on a sheet material according to the invention, and have a top layer applied thereon, wherein the aforementioned top layer comprises at least one decorative effect and a transparent or translucent wearing layer and the method comprises at least the following steps:

the step of applying an acrylate resin containing a thermal initiator on the aforementioned decorative effect; preferably it is an acrylate resin as described above; and the step of the at least partial curing of the aforementioned acrylate resin by means of a heated pressing operation for forming at least one portion of the aforementioned wearing layer. The pressing operation is preferably carried out on the basis of a short-cycle press and/or the pressing operation is carried out at a temperature from 120 to 220° C. and/or at a pressure from 10 to 80 bar. The pressing operation is preferably carried out by means of a structured press element. The aforementioned pressing operation is preferably carried out on a stack that comprises at least the substrate, the decorative effect and the acrylate resin. The step of applying an acrylate resin on the aforementioned decorative effect is preferably carried out while the decorative effect already forms part of a stack that comprises at least the substrate and the decorative effect. Preferably the aforementioned decorative effect comprises a carrier film, such as a paper sheet, and the method further comprises at least the step of providing the carrier film in question with synthetic material, such as at least the application of a water-based, or a water-borne UV-curable synthetic material on the aforementioned carrier film. Optionally the acrylate resin may have already been applied on the decorative-effect paper.

According to a variant of the present invention, it is also possible that the possible compositions of the second layer of material described above are used to form the full thickness of a sheet material, or at least more than half of the thickness of said sheet material. According to a fourth independent aspect, the present invention then also relates to a sheet material with at least one, and preferably only one, layer of material, wherein this layer of material is mainly built up from particulate particles glued with a binder and pressed, wherein the binder is thermoplastic and/or elastomeric. The inventors have established that board of this kind can be extremely flexible, and may find or offer particular applications and design freedom for example in the manufacture of furniture. Said sheet material can be formed thermally and in addition the sheet material obtained is easy to recycle. The final sheet material may have a thickness from 2 to 20 mm, preferably from 6 to 15 mm. It is clear that the layer of material in question then preferably forms 50 percent of the thickness of the sheet material or more, preferably at least 75%, or even forms the full thickness or almost the full thickness of the sheet material.

Preferably the sheet material according to the fourth aspect of the invention has a decorative top layer that is applied on the surface of the layer of material.

According to another variant, the composition of the aforementioned second layer of material may also be used as substrate for a decorative covering material, such as for a wrapping material. For this purpose, according to an independent fifth aspect, the invention further relates to a decorative covering material with at least one decorative top layer that is applied on the surface of a layer of material, wherein this layer of material is mainly built up from particulate particles glued with a binder and pressed, wherein the binder is thermoplastic and/or elastomeric. In this way, a thin, flexible covering material is obtained, for example with a thickness from 1 to 5 mm, and better still 1.5 to 3 mm. Said covering material can be formed thermally, can be completely waterproof and can be made to be recyclable.

In the context of the fourth and/or fifth aspect, the binder used is preferably polyvinyl butyral (PVB).

Preferably the particulate particles used in the context of the fourth and/or fifth aspect are wood chips, preferably with the dimensions, d50 values, that are stated in the context of the first aspect. However, it is also possible to use wood fibres as particulate particles.

Preferably, the particulate particles used in the context of the fourth and/or fifth aspect are coated with a thermosetting binder before being glued and pressed. More preferably, coating with glue is performed using melamine formaldehyde, urea formaldehyde, melamine-urea-formaldehyde, phenol formaldehyde, phenol-urea-formaldehyde, MDI (methylene diphenyl diisocyanate), pMDI ("polymeric methylene diphenyl diisocyanate"), thermosetting acrylate resin, or a binder obtained by a reaction with dextrose is or comprises. More preferably using methylene diphenyl diisocyanate (MDI) which comprises a polyol or a polycaprolactam or another flexible chain extender; or using polymeric methylene diisocyanate (pMDI) which comprises a polyol or a polycaprolactam or another flexible chain extender.

According to an important example of the fourth and/or fifth aspect, 35 to 55 wt % of polyvinyl butyral (PVB) is used as binder and 45 to 65 wt % of wood chips are used as particulate particles.

It should also be noted that where "internal bond" is mentioned in the foregoing, the value is determined as defined on the basis of EN 319:1993 for the resistance to forces normal to the surface of the sheet material.

It should also be noted that the second layer of material as mentioned in the preceding independent aspects and the preferred embodiments thereof may further comprise additives, such as fire-retardant additives, water-repellent additives (e.g. wax, paraffin, and the like), adhesion promoters (e.g. silane-based additives), reinforcing materials (e.g. glass fibres, basalt fibres, and the like), odour molecules (e.g. to imitate the odour of real wood), fillers (such as perlite, glass spheres, $CaCO_3$, and the like), colouring matter (e.g. to imitate the thickness of a top layer of veneer). The thickness of the second layer of material is preferably 0.3 to 3 mm.

If the sheet material of the invention is used in a floor panel, such as is the case in the context of the third independent aspect, this floor panel is preferably provided on at least two opposite edges with coupling means that allow said floor panel to be coupled on the edges in question with a similar floor panel, wherein a mutual locking arises on the coupled edges in question both in a vertical direction perpendicular to the plane of the coupled floor panels, and in a horizontal direction perpendicular to the edges in question and in the plane of the coupled floor panels. The coupling means in question are preferably formed substantially in the aforementioned first layer of material. An optional contact near the upper edge may be formed on the aforementioned second layer of material. Preferably the aforementioned coupling parts are made substantially as a tooth and groove that are provided with locking elements that hinder movement of the tooth and groove from one another in the aforementioned horizontal direction. The aforementioned locking elements may for example comprise a recess delimited by a projecting portion on one or both lips that delimit the aforementioned groove and a portion of the tooth interacting therewith. It is clear that the aforementioned locking in the vertical direction is achieved by the interaction between the tooth and the groove.

As stated in the introduction, the inventors came to the conclusion that the presence of a density peak near the surface of an MDF or HDF board is largely responsible for the production of irritating noise.

As a first alternative to the sheet material and the floor panels of the present invention, it is then also possible to sand the MDF or HDF board to the level below the peak density at least on the surface that is intended to be walked on. This sanding operation is preferably then carried out on both surfaces, so that a stable board is obtained again. It is therefore clear that, according to a sixth independent aspect, the present invention also relates to a method for making floor panels, wherein this method comprises at least the following steps:

the step of making a wood fibre board of the HDF type, namely with an average density of at least 800 kg/m$^3$; preferably it relates to a wood fibre board based on wood fibres and UF, MF, MUF or pMDI resin;

the step of sanding one or both surfaces of the aforementioned wood fibre board to a depth of 0.3 to 1 millimeter, preferably 0.3 to 0.6 or about 0.4 mm;

the step of applying a decorative top layer on at least one of the sanded surfaces. Preferably the decorative top layer relates to a wood veneer, a, preferably printed, film out of thermoplastic material, or a decorative top layer based on acrylic resin, preferably thermally cured acrylic resin, of the type as described in more detail above, among other things referring to BE 2018/5787, or unsaturated polyester resin.

Alternatives which may be used for the acrylic resin include, for example: a dual-cure aliphatic acrylate varnish (that is to say an aliphatic acrylate varnish which is cured by a combination of thermal and UV curing), a solvent-based urethane acrylate varnish, UV- or electron beam (EB) curing acrylate varnishes.

As a second alternative to the sheet material and the floor panels of the present invention, it is then also possible to produce the MDF or HDF board with a more uniform density profile. This is for example possible by preheating the fibre mat that is to be pressed, for example by means of microwaves. It is therefore clear that, according to a seventh independent aspect, the present invention also relates to a method for making floor panels, wherein this method comprises at least the following steps:

the step of providing a mat of glued wood fibres; preferably glued with MF, MUF, UF, or pMDI;

the step of heating the aforementioned mat, preferably by means of microwaves, prior to the pressing thereof;

the step of pressing the aforementioned mat to a wood fibre board with an average density of at least 700 kg/m$^3$ and better still at least 800 kg/m$^3$;

the step of applying a decorative top layer on at least one of the surfaces of the aforementioned wood fibre board. Preferably the decorative top layer relates to a wood veneer, a, preferably printed, film out of synthetic material, or a decorative top layer based on acrylic resin, preferably thermally cured acrylic resin, of the type as described in more detail above, among other things referring to BE 2018/5787, or unsaturated polyester resin.

BRIEF DESCRIPTION OF THE DRAWINGS

With the aim of demonstrating the features of the invention better, some preferred embodiments are described hereunder, as examples without any limiting character, referring to the appended drawings, in which.

DETAILED DESCRIPTION OF VARIOUS EMBODIMENTS

Figure 1:
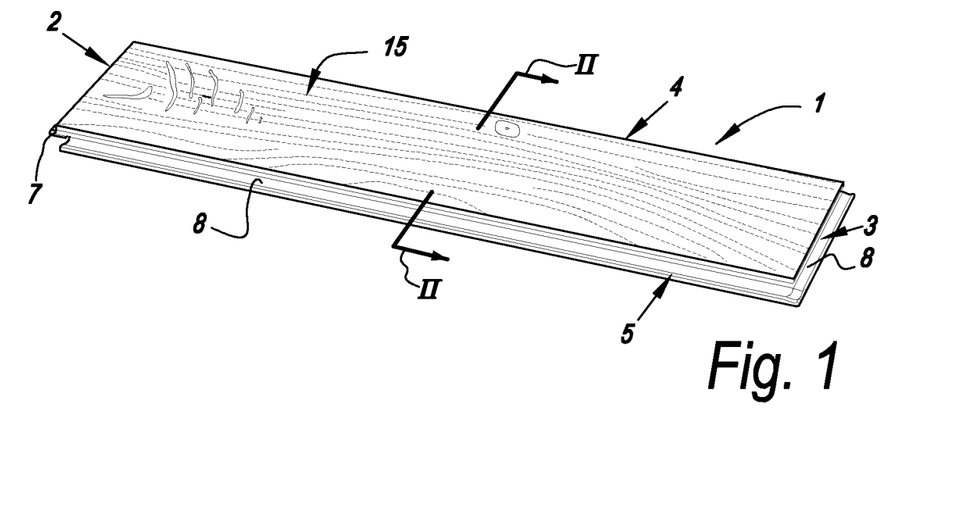
FIG. 1 shows a floor panel with the features of the invention.

FIG. 1 shows a decorative panel, more particularly a floor panel 1, in accordance with the invention. The panel 1 is rectangular and elongated and comprises a pair of opposite short edges 2-3 and a pair of opposite long edges 4-5.

Figure 2:
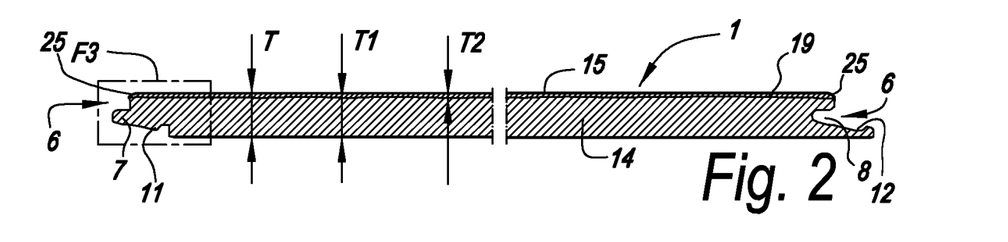
FIG. 2 shows a cross-section along line II-II shown in FIG. 1.
Figure 3:
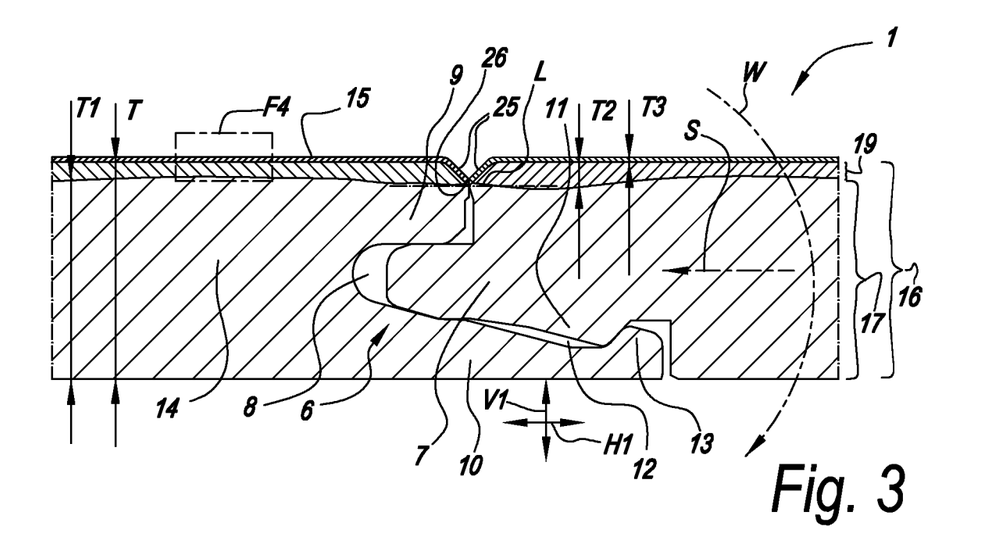
FIG. 3 shows, on a larger scale, a view of the region that is indicated with F3 in FIG. 2, in a coupled state of two of said floor panels.

FIGS. 1 to 3 show that both pairs of opposite edges 2-3-4-5 are provided with mechanical coupling means 6 that are mainly realized as a tooth 7 and a groove 8 delimited by an upper lip 9 and a lower lip 10, wherein the tooth 7 and the groove 8 are mainly responsible for the locking in a vertical direction V1, and wherein the tooth 7 and the groove 8 are provided with additional locking elements 11-12, which are mainly responsible for the locking in a horizontal direction Hl. Preferably the locking elements comprise a projection 11 on the underside of the tooth 7 and a recess 12 in the lower groove lip 10, delimited by a projecting portion 13. The coupling means 6 shown in FIGS. 1 to 3 allow at least coupling by means of a rotating movement W round the respective edges 2-3-4-5 and/or coupling by means of a sliding movement S in a substantially horizontal manner of the edges to be coupled 2-3-4-5 towards each other.

FIG. 3 clearly shows that the decorative panel 1 comprises a substrate 14 on which a decorative top layer 15 is provided.

The particular feature of the floor panel 1 from FIGS. 1 to 3 is among other things that the substrate 14 is obtained on the basis of a sheet material 16 according to the first aspect of the invention. For this purpose the sheet material 16 comprises a first layer of material 17 which forms more than half of the thickness T of the sheet material 16 and is mainly built up from wood particles glued by means of a first binder and pressed. In this case the first layer of material 17 has the structure of a typical HDF board. It is namely built up from wood fibres 18 glued by means of MUF and pressed.

Figure 4:
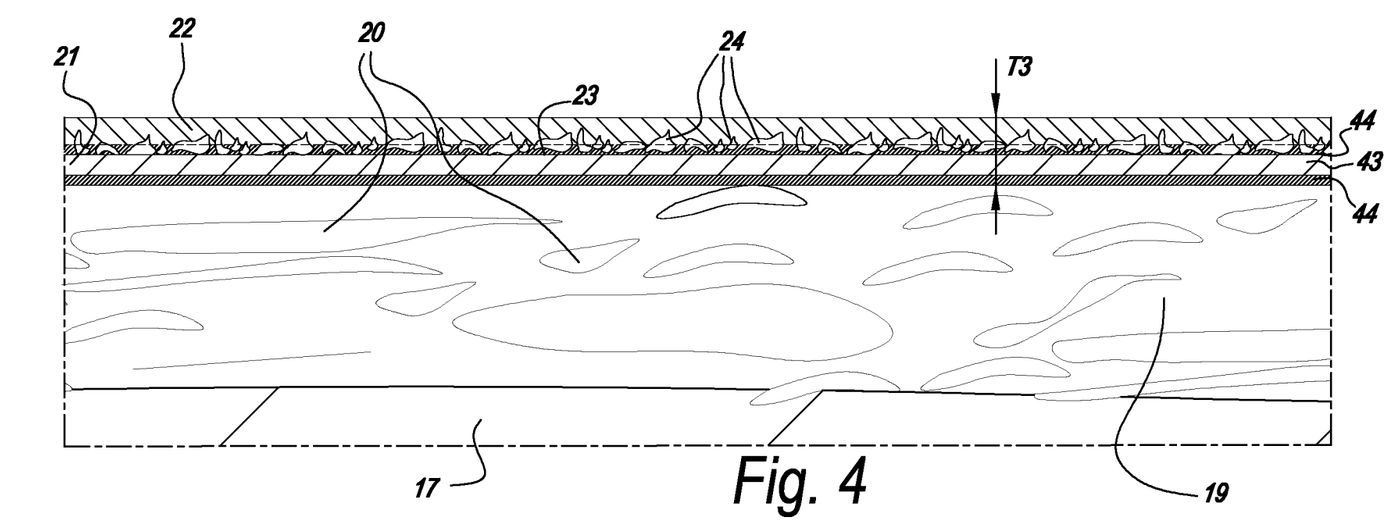
FIG. 4 shows, on a larger scale, a view of the region that is indicated with F4 in FIG. 3.

FIG. 4 clearly shows that the sheet material 16 additionally has a second layer of material 19 on the surface, wherein this second layer of material 19 is mainly built up from particulate particles 20 glued by means of a second binder and pressed. The second binder is in the present case thermoplastic, more particularly polyvinyl butyral (PVB) obtained by recycling of glass. The particulate particles 20 are wood chips with a particle size of 500 micrometres or more, as expressed with the d50 value measured by laser diffraction granulometry according to ISO13320 (2009). According to a concrete example, the wood chips have the following particle size distribution.

| | Fraction weight | |
|---|---|---|
| Size (mm) | weight (g) | Mass (%) |
| >3 | 21.5 | 4.174757 |
| 2.5-3 | 48.5 | 9.417476 |
| 2-2.5 | 29.5 | 5.728155 |
| 1.4-2 | 189.5 | 36.79612 |
| 1-1.4 | 63.5 | 12.3301 |
| <1 | 162.5 | 31.5534 |
| | 515 | 100 |

The thickness T1 of the aforementioned first layer of material 17 is at least three times the thickness T2 of the aforementioned second layer of material 19.

The sheet material 16 consists of the aforementioned first layer of material 17 and second layer of material 19, and thus does not have any further layers of material than the aforementioned first and second layers of material 17-19. The aforementioned decorative top layer 15 is applied on the surface of the sheet material 16 that is formed by the aforementioned second layer of material 19.

The aforementioned decorative top layer 15 comprises a printed paper sheet 21 and a transparent or translucent layer 22 applied thereon. In this case the transparent or translucent layer comprises synthetic material, which is subjected at least to thermal curing, more particularly it relates here to thermally cured acrylate resin or unsaturated polyester, preferably cured on the basis of an at least thermally initiated radical crosslinking reaction.

FIG. 4 shows the printed paper sheet 21. Preferably the core of this paper sheet 21 is provided with modified or unmodified melamine resin. On both surfaces of the paper sheet 21, in this example a synthetic material is provided that comprises double carbon bonds, such as polyurethane. As an alternative to said polyurethane, use can for example be made of a water-based polyurethane dispersion. Above that, as already stated, the transparent or translucent wearing layer 22 is present. In the top layer 15, in a position above the print 23, hard particles 24, such as aluminium oxide particles, are applied additionally in order to obtain improved wear resistance.

FIGS. 2 and 3 clearly show that the aforementioned decorative top layer 14 has a relief with structural features that have a depth greater than the thickness T3 of the decorative top layer 15. On the edges of at least two opposite sides, the floor panel has lower edge regions 25, in this case in the form of a chamfer. The print 23 or decorative effect extends as far as the respective upper edge 26. The underside of the decorative top layer 15 is located at the position of the upper edge 25 on a horizontal level L that extends below the level of the second layer of material 19.

Figure 5:
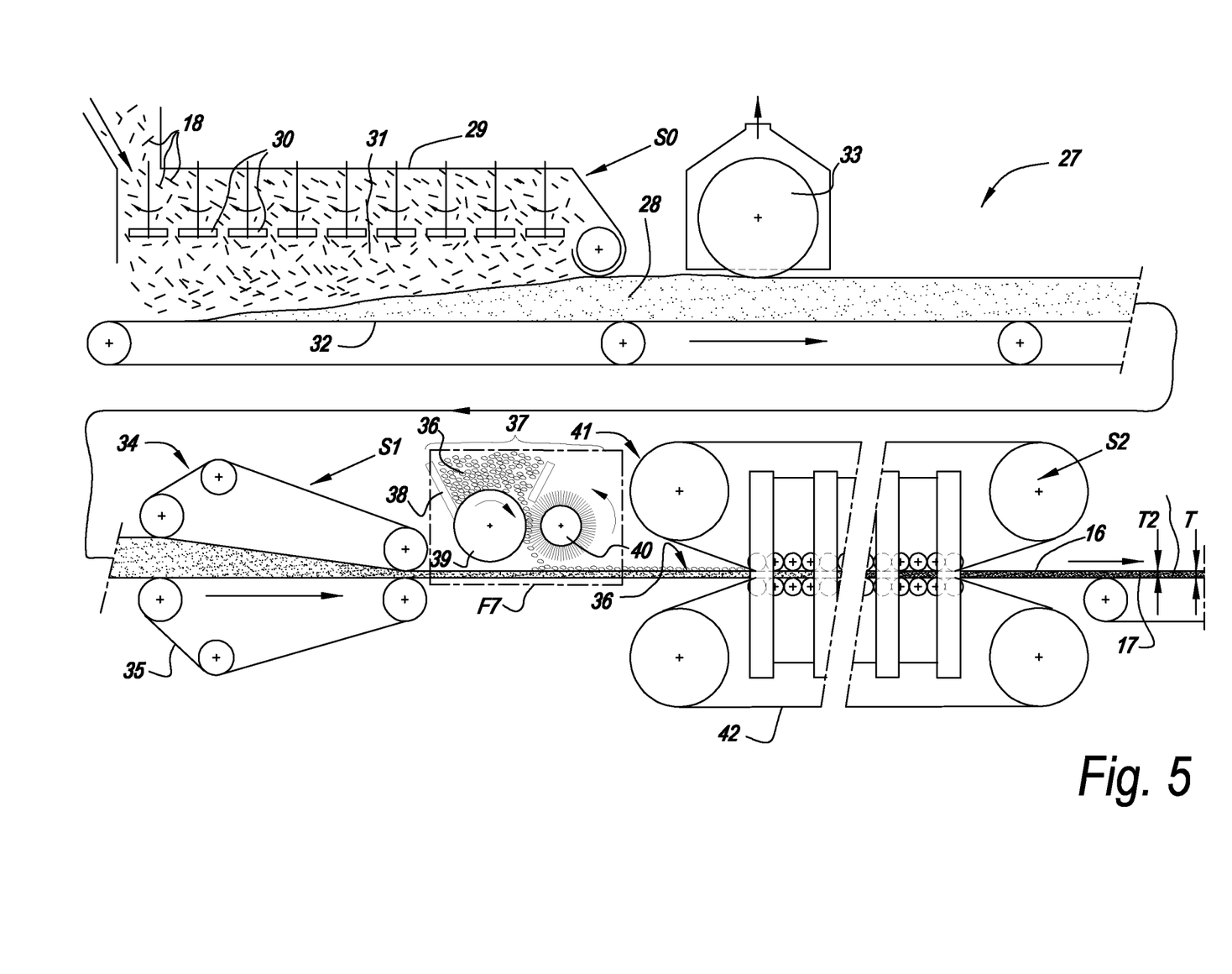
FIG. 5 shows schematically some steps in a method for making a sheet material with the features of the invention.

FIG. 5 shows schematically a method for making a sheet material 16 with the properties of the invention. In the example, it relates to a method that is carried out on the basis of a production line 27 which corresponds substantially to a typical MDF or HDF production line. In this case it starts from a material mass 28 for the aforementioned first layer of material 17, which in a preceding step 50 is assembled at least on the basis of the aforementioned first binder and the aforementioned wood particles. In this case both constituents are fed simultaneously into a spreading machine 29 in the form of wood particles provided beforehand with a first binder, namely polycondensation glue, more particularly wood fibres 18 provided with polycondensation glue, for example MUF.

The spreading machine 29 of said production line 27 may be of any design. In the example, a spreading machine 29 is used such as that known per se from WO 03/053642. The spreading machine 29 of the example is provided with several agitating elements 30 which bring the glued wood fibres 18 in motion in the spreading chamber 31. On the basis of the wood fibres 18 that leave the spreading chamber 31 on the underside, the material mass 28 is assembled on the conveying device or conveyor belt 32 located thereunder. For further description of said spreading machine 29, refer to the aforementioned international patent application. Other types of spreading machines are of course also suitable, for example such as the spreading machines described in the international patent applications WO 99/36623 and WO 2005/044529.

Seen in succession, the spreading machine 29 is followed by a so-called scalpel roll 33, which removes any excess wood fibres 18 from the material mass 28, after which a material mass 28 with a flat or almost flat upper surface is then obtained. It is to be noted that it is not essential to work with said scalpel roll 33.

In succession, the aforementioned scalpel roll 33 is followed by a compacting device or pre-press 34 in which the assembled material mass 28 is gradually compacted beforehand on the actual hot presses in step S2 to a state in which they can be transported more easily in comparison with the uncompacted assembled material mass 28. For this purpose, the assembled material mass 28 is transported during step S1 preferably, as shown here, between press bands 35, wherein these press bands 35 have a successively decreasing clearance. In this pre-compaction in the pre-press 34, preferably no heat is supplied and/or, preferably, the first binder that is present is not yet or only partially activated. Rather, the pre-compaction is preferably at least partial removal of the gases, such as air, present in the assembled material mass 28.

After the aforementioned pre-compaction in step S1 has been carried out, granules 36 are applied on the material mass 28 of the first layer of material 17. The granules 36 in question comprise the aforementioned second binder and the particulate particles 20, in this case polyvinyl butyral (PVB) and wood chips, optionally supplemented with a glue fraction, for example pMDI. For this purpose, seen in succession, the spreading machine 29 is followed by a device 37 for applying the aforementioned granules 34 on the material mass 28. In this case the device 37 executes a spreading operation. For this purpose, for example a spreading device may be used such as is known per se from GB 1,003,597 or GB 1,035,256. As illustrated in FIG. 5, said spreading device may comprise a recipient 38 that is connected to a metering roll 39, which carries the granules 36 away from the recipient 38. Said metering roll 39 is preferably of structured design, wherein the granules 36 are then entrained mainly via the lower structural portions of the metering roll 39. Said spreading device preferably further comprises a device 40 which detaches the granules 36 from the aforementioned metering roll 39. In this case a brush device is used for this purpose. On the basis of said spreading device, sufficiently uniform spreading can be obtained.

After the compacting device or pre-press 34, and the device 37, there is, viewed in the direction of passage, the actual press 41, in which the assembled material mass is pressed under the effect of heat. The temperature used may be for example between 100° C. and 150° C. and the pressure used may be for example on average between 4 and 10 bar, although brief peak pressures up to 40 bar are not excluded. Preferably, the binder present in the granules 36 is melted in this press 41, or at least heated to above its glass transition temperature. Preferably, activation of the first binder present on the wood fibres 18 also takes place here. In the case of a polycondensation glue, water or rather steam may be produced in this press 41.

The press 41 shown here is of the continuous type, namely of the type wherein the assembled material mass is transported and/or is gradually pressed between press bands 42. A pressure and/or temperature variation may be created on passing through said press 41. By means of this press 41, the density of the already partially compacted assembled material mass 16 can be at least doubled. It is clear that the method of the invention can also be carried out with other presses, for example such as with a vapour pressure press, with a multistage press or with a so-called short-cycle press. With these other presses 41, the pressure and/or temperature employed may be set as a function of the time that the material mass in question remains in the press 41.

It is clear from the foregoing that FIG. 5 forms an example of the fifth concrete possibility described in the introduction for the step of depositing particulate particles 20 and binder particles of the second layer of material 19. It is clear that the other concrete possibilities presented there can also be used in a production line 27, by varying the contents of the recipient 38 and/or the number of devices 37 according to the desired possibility. Preferably all the devices 37 or spreading operations for the second layer of material 19 are located between the pre-press 34 and the actual press 41.

Figure 6:
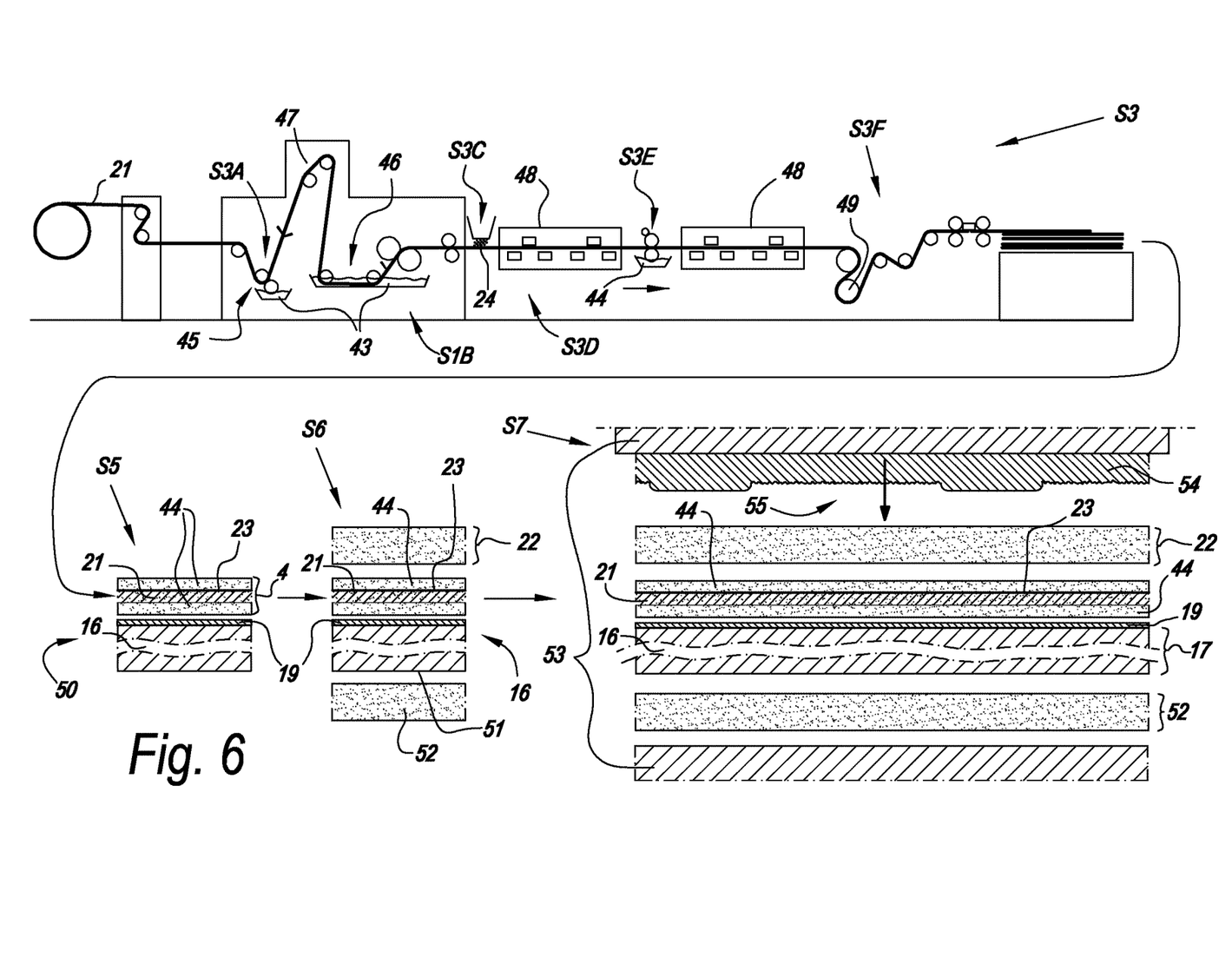
FIG. 6 shows schematically some steps in a method for making a floor panel with the features of the invention.

FIG. 6 shows schematically some steps in a method for making the floor panel 1 from FIGS. 1 to 4. In the example, it starts from a decorative top layer 15 that comprises at least one paper sheet 21. The paper sheet 21 is provided with a print 23. In a first step S3, the paper sheet 21, more particularly a paper web from which the paper sheet 21 will be obtained later by cutting, is provided with synthetic material 43. For this purpose, the paper web is unrolled and the core is impregnated with a first synthetic material 43. Core impregnation may limit the risk of splitting of the paper sheet 21 in the final covered panel 1. In the example, this core impregnation takes place in two substeps, namely a first substep S3A in which synthetic material 43 is applied by means of a roll 45, and a second substep S3B in which the paper sheet 21 is immersed in a bath 46 of the respective synthetic material 43. In the example, the synthetic material 43 that is applied in the first substep S3A and in the second substep S3B is the same. It is, however, also possible that the synthetic material applied in the first substep and in the second substep are different from one another, regardless of the actual application technique that is employed. Between the first substep S3A and the second substep S3B, the paper sheet 21 follows a path 47 that allows sufficient penetration of the first synthetic material 43 applied during the first substep S3A. As the first synthetic material 43, it is possible to use a modified or unmodified melamine-formaldehyde resin, modified or unmodified urea-formaldehyde resin or modified or unmodified melamine-urea-formaldehyde resin.

FIG. 6 further shows that, after the aforementioned core impregnation, aluminium oxide particles 24 may be applied in a third substep S3C, for example, as here, by a spreading operation. This is preferably followed in a fourth substep S3D by a drying operation in a hot air oven 48. Optionally, in a fifth substep S3E, an interlamellar coating 44, which increases the compatibility with the wearing layer 22 to be formed from thermosetting acrylate resin or unsaturated polyester, may be applied on the side of the print 23 and/or the side of the paper sheet 21 that is intended to face the wearing layer 22. This interlamellar coating 44 may for example consist of a water-based polyurethane coating, a water-based UV curing substance and/or carbodiimide. During the same step S3E, or in a separate step, a coating 44 may also be applied on the side of the paper sheet 21 that is intended to face the substrate 14. This coating 44 has the purpose of providing better adhesion with the substrate 14. According to another possibility, said coating 44 may also have the purpose of providing sound damping. In this last case it is preferable to use polyurethane, for example aromatic polyurethane or thermoplastic polyurethane (TPU). After application of the interlamellar coating 44, as in the example, a drying operation may be carried out again, similar to that in the fourth substep S3D.

In a seventh substep S3F, the treated paper sheet 21 passes in this example over a cooling roll 49, and the paper web is divided into sheets.

In a second step S5, a stack 50 is formed, which at least comprises the substrate 14 and the paper sheet 21 with the print 23, obtained in step S3.

Preferably a method of the invention comprises at least the third step shown S5, namely the step of applying, on top of the print 23 or the decorative effect, an acrylate resin containing a thermal initiator, and the fourth step shown S6, namely the step of at least partially curing the aforementioned acrylate resin in a heated pressing operation. In the third step S5, an acrylate resin with a thermal initiator is also applied on the underside 51 of the substrate 14, for forming a balance layer 52. It is clear that here the third step S5, namely the step of applying the acrylate resin, is carried out while the paper sheet 21 with the print 23 or decorative effect already forms part of a stack 50, which comprises at least the substrate 14 and the decorative effect or the paper sheet 21 with the print 23.

In the example shown, the pressing operation is carried out using a so-called short-cycle press 53, and more particularly using a structured press element 54 or pressure plate. The pressing operation is carried out on a stack 50 that comprises the substrate 14, the paper sheet 21 with the print 23, the acrylate resin of the wearing layer 22 and the balance layer 52. During the pressing operation, the structure 55 of the press element 54 is copied in the surface of the wearing layer 22.

Figure 7:
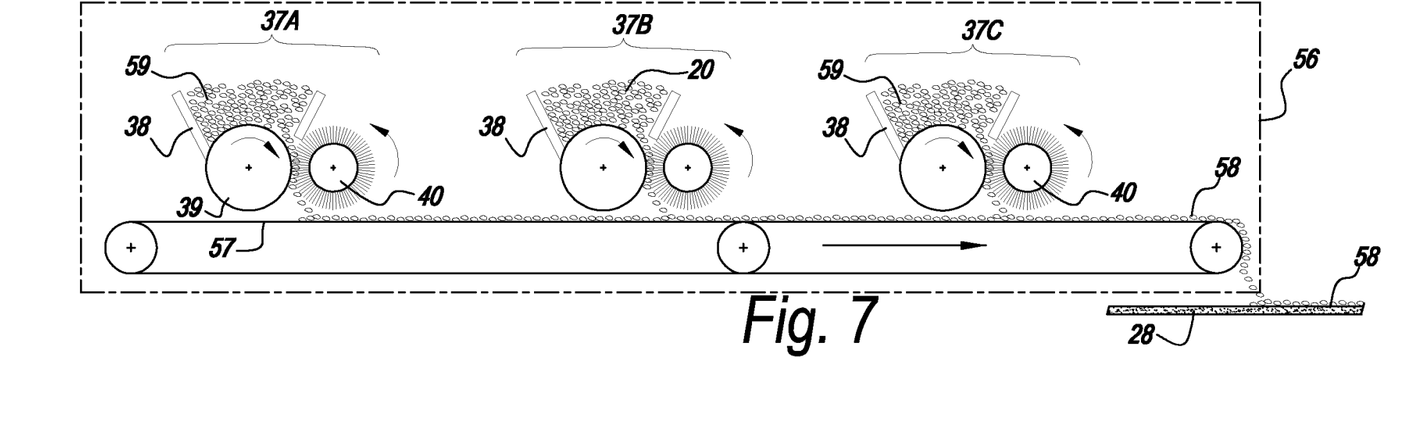
FIG. 7 gives, on a larger scale, a view of the region that is indicated with F7 in FIG. 5 for a variant.

FIG. 7 shows a variant of the device 37 shown in FIG. 5. This relates to a device 56 that comprises one or more devices 37A-37B-37C or spreading machines, which deposit particulate particles, first binder and/or granules on a conveying device, in this case a conveyor belt 57. The devices 37A-37B-37C shown here are similar to those described in the context of FIG. 5. The assembled material mass 58 for the second layer of material 19, or a portion thereof, is transferred, here poured, via the conveyor belt 57 onto the material mass 28 for the first layer of material 17. It is obvious that using the device 57 shown here, several of the concrete possibilities stated in the introduction for the step of depositing particulate particles 20 and binder particles 59 of the second layer of material 19 can be carried out. Preferably, using at least one of the spreading devices, for example spreading device 37B, wood chips are deposited. Using one or more of the other spreading devices 37A-37C, particles 59 of the first binder may be deposited on the conveyor belt 58. Preferably, as shown here, in the direction of passage first a layer of binder particles 59 is deposited, then a layer of wood chips and then a layer of binder particles 59 again.

It is to be noted that a device 57 wherein the second material mass 58 is assembled on a conveyor belt 58 may also be used for applying the material mass in question 58, instead of on the first material mass 28 that is still to be pressed, on an already preformed substrate that consists substantially only of the aforementioned first layer of material 17.

Figure 8:
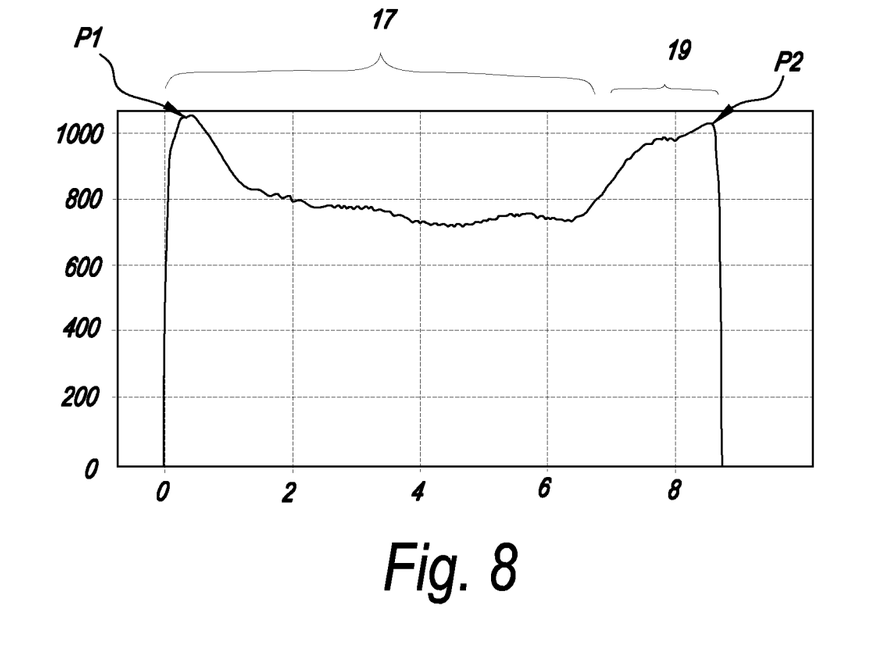
FIG. 8 shows a graph with the density of the sheet material from FIGS. 1 to 4 as a function of the thickness thereof.

FIG. 8 shows a graph with the density of the sheet material from FIGS. 1 to 4 on the ordinate and the thickness on the abscissa, wherein the thickness is expressed in mm, and the density in kg/m$^3$. The thickness 0 mm coincides with the side of the sheet material that is formed by the first layer of material 17, whereas the thickness 8 mm is located near the surface formed by the second layer of material 19. The graph shows an average density of 830 kg/m$^3$, a peak density P1 near the surface of the first layer of material 17 of 1058 kg/m$^3$ and a peak density P2 near the surface of the second layer of material 19 of 1033 kg/m$^3$. It is clear from the graph that the sheet material in question has the properties of the particular independent aspect stated in the introduction. The density remains between the aforementioned peak densities P1-P2 below the level of these peaks, but remains above the level of 80% of the average density. The minimum density is 717 kg/m$^3$ and is reached roughly in half of the thickness of the sheet material.

It is clear from FIG. 8 that a density profile is reached that is very similar to that of a standard HDF board, but wherein one of the peak densities P2 is formed in the aforementioned second layer of material 19.

Figure 9:
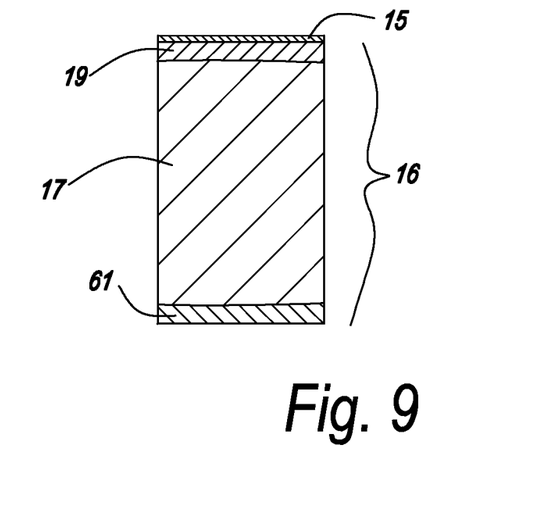
FIG. 9 shows a cross-section of a sheet material according to one embodiment of the invention.

FIG. 9 shows a cross section of a sheet material according to an embodiment of the invention. The sheet material comprises a substrate 16 and a decorative top layer 15. The substrate comprises a first layer of material 17, a second layer of material 19 and a third layer of material 61. The first layer of material 17 is situated between the second layer of material 19 and the third layer of material 61. The first layer of material 17 may be configured as described for the first layer of material in any embodiment of the invention. The second layer of material 19 may be configured as described for the second layer of material in any embodiment of the invention. The third layer of material 61 comprises the features of the second layer of material as described in any of the embodiments of the second layer of material.

The present invention is by no means limited to the embodiments described above, but said sheet material and floor panels may be made according to several variants while remaining within the scope of the present invention.

The invention claimed is:

1. A sheet material with at least first and second layers of material, wherein the first layer of material forms more than half of the thickness of the sheet material and is mainly built up from wood particles glued by means of a first binder and pressed, wherein the first binder is thermosetting, wherein the wood particles of the first layer of material are wood fibres;

wherein the second layer of material is present on a first surface of the sheet material and is mainly built up from particulate particles glued by means of a second binder and pressed, wherein the second binder is thermoplastic or elastomeric;

wherein the particulate particles of the second layer of material are or comprise wood chips or wood fibres;

wherein the sheet material has a density profile over the thickness of the sheet material, wherein the density profile has a first peak density formed in the material of the first layer of material, and a second peak density formed in the material of the second layer of material;

wherein a decorative top layer is arranged on the second layer of material;

wherein the decorative top layer comprises a printed paper sheet and a transparent or translucent layer applied thereon;

wherein the transparent or translucent layer comprises synthetic material that is a thermally cured acrylate resin based on a multifunctional acrylate monomer and an acrylate oligomer;

wherein a polyurethane coating is applied on at least one surface of the printed paper, the at least one surface of the printed paper sheet facing the transparent or translucent layer.

2. The sheet material of claim 1, wherein the first binder is chosen from the group consisting of melamine formaldehyde, urea formaldehyde, melamine-urea-formaldehyde, phenol formaldehyde, phenol-urea-formaldehyde, MDI ("methylene diphenyl diisocyanate"), pMDI ("polymeric methylene diphenyl diisocyanate"), thermosetting acrylate resin and a binder obtained by reaction with dextrose.

3. The sheet material of claim 1, wherein the particulate particles of the second layer of material have a particle size of 500 micrometres or more, as expressed with the d50 value measured by laser diffraction granulometry, in accordance with ISO13320 (2009).

4. The sheet material of claim 1, wherein the second binder is thermoplastic and is selected from the group consisting of polyvinyl butyral (PVB), polyvinyl butyrate, polyvinyl chloride (PVC), polyvinyl dichloride (PVdC), polypropylene (PP), polyethylene (PE), polyethylene terephthalate (PET), thermoplastic polyurethane (TPU), thermoplastic aliphatic polyester, such as polylactic acid (PLA), thermoplastic olefin (TPO); or wherein the second binder is elastomeric and is selected from the group of synthetic rubber, silicone, polyvinyl butyral and natural rubber.

5. The sheet material of claim 1, wherein the second binder comprises polyvinyl butyral;

or cross-linked polyvinyl butyral, or polyvinyl butyral comprises plasticizers, or cross-linked polyvinyl butyral comprising plasticizers.

6. The sheet material of claim 1, wherein the particulate particles are coated with a thermosetting binder before being glued and pressed.

7. The sheet material of claim 6, wherein the thermosetting binder with which the particulate particles are coated before being glued and pressed comprises melamine formaldehyde, urea formaldehyde, melamine-urea-formaldehyde, phenol formaldehyde, phenol-urea-formaldehyde, MDI (methylene diphenyl diisocyanate), pMDI ("polymeric methylene diphenyl diisocyanate"), thermosetting acrylate resin or a binder obtained by reaction with dextrose, methylene diphenyl diisocyanate (MDI) or polymeric methylene diisocyanate (pMDI) which comprise a polyol or a polycaprolactam or another flexible chain extender.

8. The sheet material of claim 1, wherein the sheet material comprises a third layer of material, wherein the first layer of material is situated between the second layer of material and the third layer of material, wherein the third layer of material is mainly built up from particulate particles glued by means of the second binder and pressed, wherein the second binder is thermoplastic or elastomeric;

wherein the particulate particles of the second layer of material are or comprise wood chips or wood fibres.

9. The sheet material of claim 1, wherein the first surface of the first layer of material has a first colour, and the first surface of the second layer of material has a second colour, wherein the first surface of the first layer of material is visible on the surface of the sheet material next to the first surface of the second layer of material according to a regular or irregular pattern.

10. A floor panel comprising a substrate, wherein the substrate comprises a sheet material;

wherein the sheet material comprises at least two layers of material, wherein a first layer of material forms more than half of the thickness of the sheet material and is mainly built up from wood particles glued by means of a first binder and pressed, wherein the first binder is thermosetting, wherein the wood particles of the first layer of material are wood fibres;

wherein a second layer of material is present on the surface of the sheet material and is mainly built up from particulate particles glued by means of a second binder and pressed, wherein the second binder is thermoplastic or elastomeric;

the particulate particles of the second layer of material are or comprise wood chips or wood fibres;

wherein the floor panel comprises a decorative top layer applied on the second layer of material;

wherein the decorative top layer comprises a printed paper sheet and a transparent or translucent layer applied thereon;

wherein the transparent or translucent layer comprises synthetic material that is a thermally cured acrylate resin based on a multifunctional acrylate monomer and an acrylate oligomer;

wherein a polyurethane coating is applied on at least one surface of the printed paper, the at least one surface of the printed paper sheet facing the transparent or translucent layer.

11. The floor panel of claim 10, wherein the decorative top layer has a relief with structural features that have a depth greater than the thickness of the decorative top layer, wherein the relief comprises elements with a depth of between 200 and 2000 micrometres.

12. The floor panel of claim 11, wherein the structural features form lower edge regions at least on one or more edges of the floor panel, including edge regions in the form of a chamfer.

13. A sheet material with at least one layer of material, wherein this layer of material is substantially built up from particulate particles which are glued by means of a binder and pressed, wherein the binder is thermoplastic or elastomeric;

wherein the particulate particles are wood chips or wood fibres;

wherein the binder is polyvinyl butyral (PVB);

wherein at least one decorative top layer is arranged on the at least one layer of material;

wherein the decorative top layer comprises a printed paper sheet and a transparent or translucent layer applied thereon, wherein the transparent or translucent layer comprises synthetic material that is a thermally cured synthetic material based on a thermally cured acrylate resin based on a multifunctional acrylate monomer and an acrylate oligomer;

wherein a polyurethane coating is applied on at least one surface of the printed paper, the at least one surface of the printed paper sheet facing the transparent or translucent layer.

14. The sheet material of claim 13, wherein the particulate particles are coated with a thermosetting binder before being glued and pressed.

15. The sheet material of claim 14, wherein the thermosetting binder with which the particulate particles are coated before being glued and pressed is or comprises melamine formaldehyde, urea formaldehyde, melamine-urea-formaldehyde, phenol formaldehyde, phenol-urea-formaldehyde, MDI (methylene diphenyl diisocyanate), pMDI ("polymeric methylene diphenyl diisocyanate"), thermosetting acrylate resin or a binder obtained by reaction with dextrose, methylene diphenyl diisocyanate (MDI) or polymeric methylene diisocyanate (pMDI) which comprise a polyol or a polycaprolactam or another flexible chain extender.

\* \* \* \* \*